Figure 5:
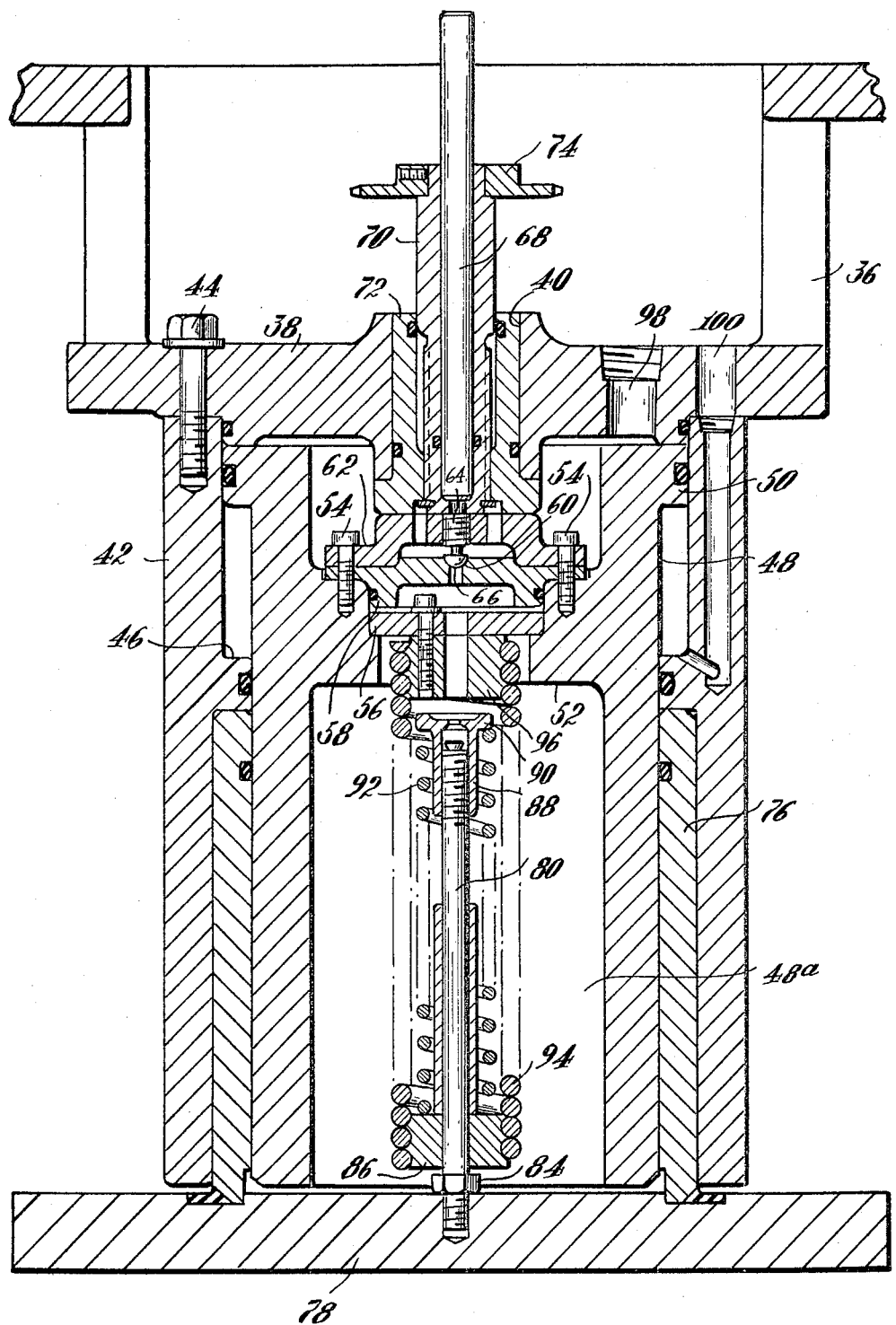

Aug. 30, 1966  C. TALAS  3,269,234
AUTOMATIC CUTTING MACHINE AND METHOD FOR COMPENSATION
OF MINOR STRUCTURAL MISALIGNMENT
Filed July 17, 1964  2 Sheets-Sheet 1
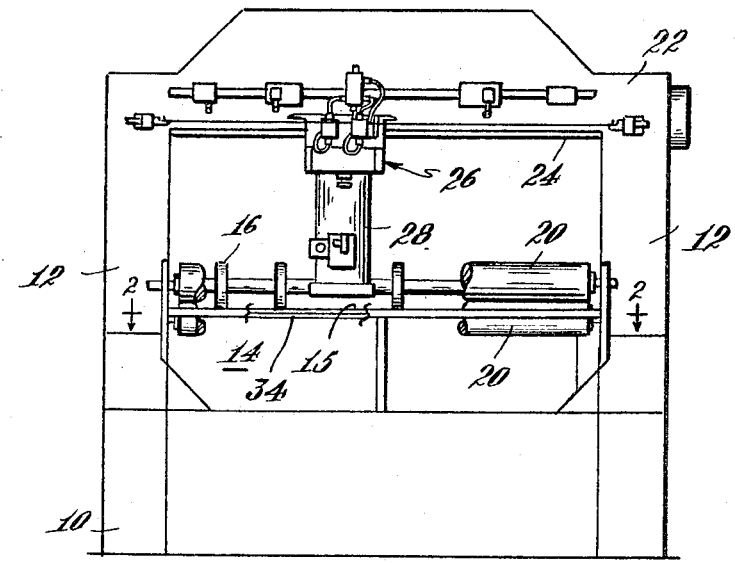
Fig. 1
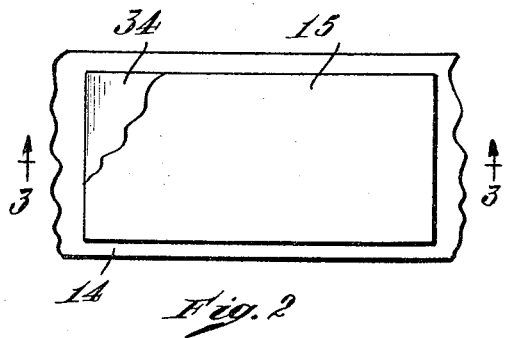
Fig. 2
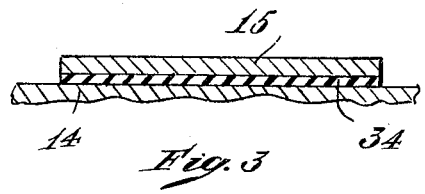
Fig. 3
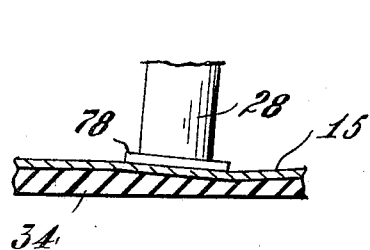
Fig. 4
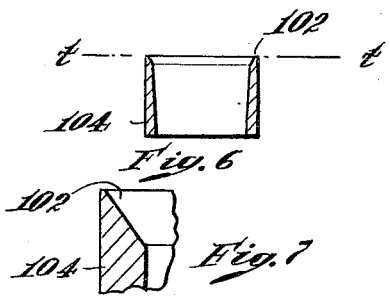
Fig. 6
Fig. 7
INVENTOR.
Constantinos Talas
BY
Roberts, Cushman & Grover
ATT'YS United States Patent Office 3,269,234
Patented August 30, 1966

3,269,234
AUTOMATIC CUTTING MACHINE AND METHOD FOR COMPENSATION OF MINOR STRUCTURAL MISALIGNMENT
Constantinos Talas, Amesbury, Mass., assignor to Compo Shoe Machinery Corporation, Waltham, Mass., a corporation of Delaware
Filed July 17, 1964, Ser. No. 383,379
15 Claims. (Cl. 83—13)

This invention relates to automatic cutting machines of the kind disclosed in the pending application of Evald O. Peterson et al., Serial No. 383,378, filed July 17, 1964, wherein a cutting die is mounted on an overhead beam parallel to a rigid platen for movement transversely of the platen, to make spaced cuts transversely of sheet material resting on the platen. The aforesaid machine is provided with means controlling the transverse movement of the die so that successive cuts are made in the same place as the die travels back and forth for any given cutting operation thereby enabling accurate cutting and economy in the use of the material. Repeated cutting at the same place requires the use of a hardened steel platen to resist wear. However, when a hardened steel platen is employed, the die cannot sink into the surface and hence if there are any minor misalignments in the supporting frame and/or die which render the cutting edge of the die and the surface of the platen with which the die has contact slightly out of parallelism, cutting will be imperfect and will fail to completely sever the part from the sheet especially if the material is very thin and/or is hard to cut.

The principal objects of this invention are to provide a machine wherein repeated cuts may be made transversely of a hardened steel platen, completely severing the part from the sheet material in spite of minor misalignment between the overhead support for the die and the platen and/or variations in deflection of the overhead support; to provide a machine in which wear of the die and the surface of the platen is minimized in spite of repeated cutting in the same place; and to provide a machine in which sufficient pressure is available to cut through the most difficult to cut material without damage to the die and/or platen.

The foregoing is accomplished herein by supporting the die at a predetermined distance above a flexible platen for movement perpendicular thereto into engagement with the work resting on the platen, supporting the platen so that it will flex under the application of cutting pressure, and providing a cutting stroke for the die which is greater than the predetermined distance between the die and platen so as to flex the portion of the platen with which the die has contact downwardly, following engagement of the die therewith, into parallelism with the entire cutting edge of the die. Preferably the means for effecting movement of the die into cutting engagement with the platen is adjustabble to vary the stroke according to the extent of misalignment and the character of the work. The pad rests on a rigid bed and the platen rests on the pad. The platen is preferably comprised of a hardened and ground tool steel harder than the die, having a thickness in the order of ⅛ to ⁵⁄₁₆ inch. The pad is comprised of rubber, or its equivalent, having a thickness in the order of ⅛ to ⅜ inch and a durometer in the order of 40 to 80.

The invention will now be described in greater detail with reference to the accompanying drawings wherein:

FIG. 1 is a front elevation of the machine;
FIG. 2 is a horizontal view taken on the line 2—2 of FIG. 1, showing the platen support, the yieldable pad and the platen resting thereon;
FIG. 3 is a vertical section, taken on the line 3—3 of FIG. 2, transversely of the platen support, pad and platen;
FIG. 4 shows diagrammatically a much exaggerated condition of misalignment between the die and the platen and the alignment afforded by the yieldable support for the platen.
FIG. 5 is a vertical section through the die-supporting cylinder by means of which the die is lowered into engagement with the work on the platen;
FIG. 6 is a section through a die showing the cutting edge honed from the inside without intersecting the outer side; and
FIG. 7 is an enlarged fragmentary section of the cutting edge of the die.

Referring to the drawings (FIG. 1), the machine has a base 10 from the opposite ends of which rise spaced parallel columns 12. A table 14 is supported on the base between the columns 12 in a horizontal position for receiving and holding a platen 15, as will be described hereinafter. Feeding means in the form of a plurality of spaced pairs of discs 16 and a pair of rolls 20 mounted at the rear and forward sides of the table provide for advancing the work lengthwise of the platen.

A beam 22 is mounted transversely of the table and parallel thereto between the upper ends of the columns 12 and has at its underside spaced parallel tracks 24 on which is slidably mounted a head 26. The head 26 is thus movable lengthwise of the beam and crosswise of the table on which the platen rests. A ram 28 is supported by the head 26 for movement therewith and is movable relative to the head perpendicular to the platen resting on the table to apply cutting pressure to a cutting die mounted on its lower end or to a die placed on the work beneath its lower end. The head is traversed by a screw, as disclosed in the aforesaid pending application, and there is means for controlling movement of the head transversely of the work support in precisely uniformly spaced steps so that for each traverse the cutting die engages the platen resting on the support in substantially the same place. Such repeated cutting in the same place is destructive except to a hardened steel platen. However, the use of a hardened steel platen for supporting the work during cutting entails the further difficulty that the cutting edge of the die cannot sink into the surface of the platen hence any misalignment results in failure of the cutting edge to meet the surface of the platen squarely and failure to make a cut which completely separates the part from the work particularly when the work is very thin. To enable the use of a hardened steel platen and at the same time to compensate for the minor misalignment of the machine frame and deflection due to pressures employed, a flexible platen is yieldingly mounted at a predetermined initial distance from the beam supporting the cutting die and the die is mounted so as to be movable a predetermined greater distance than the initial distance between the beam and platen, so as to flexibly displace the portion of the platen with which it has contact sufficiently to take up the misalignment referred to above.

The pad is in the order of about ⅛ to ⅜ inch in thickness and 40 to 80 durometer. In practice a ¼ inch pad of 65 durometer has proved satisfactory. It is to be understood that other yieldable materials may be used in lieu of rubber provided they afford an equivalent yield characteristic. The platen 15 is comprised of a hardened and ground tool steel having a hardness greater than that of the die, for example in the order of 55 Rockwell "C." The platen must be flexible without bowing and is in the order of ⅛ to ⁵⁄₁₆ inch thick.

The ram 28 (FIG. 5) which supports the die comprises a part 36 by means of which it is slidably mounted to the beam for movement transversely of the work support and has a transverse wall 38 containing a centrally disposed circular opening 40. A hollow first cylinder 42 is secured to the underside of the wall 38 in concentric relation to the opening 40 by screw bolts 44. The hollow first cylinder 42 contains internally thereof an annular shoulder 46 and a hollow second cylinder 48, corresponding in outside diameter to the inside diameter of the annular shoulder 46, and provided with an outwardly extending annular shoulder 50 at its upper end, corresponding in outside diameter to the inside diameter of the first cylinder 42, is disposed in the first cylinder 42 for sliding movement lengthwise thereof. The second cylinder 48 has near its upper end a transverse wall 52 containing a central opening within which there is mounted and secured, by means of screw bolts 54, a valve seat plate 58 containing a center hole and seat 60, and a bearing plate 62. The bearing plate 62 contains a threaded hole 64 in which there is rotatably supported a valve element 66 which is movable into and out of engagement with the valve seat 60. The valve element 66 is connected to the lower end of a spindle 68 which extends upwardly through a sleeve 70, the latter being threaded to a sleeve 72 fixed in the opening 40. The lower end of the sleeve 70 bears against the top of the bearing plate 62 and the upper end has fastened to it a sprocket 74 by means of which it may be rotated to change the upper position of the second cylinder 48 vertically in the first cylinder 42. Rotation of the spindle 68 moves the valve element 66 into and out of engagement with the seat 60. A third hollow cylinder 76, corresponding in outside diameter to the inside diameter of the first cylinder 42 and in inside diameter to the outside diameter of the second cylinder 48, is slidably disposed between the two and has fastened to its lower end a flat rigid plate 78 to which a die may be fastened. The third cylinder 76 is held in telescoping relation with the cylinders 42 and 48 by a rigid rod 80, the lower end of which is screwed into the plate 78 and fixed therein by a lock nut 84. A bearing block 86 is slidably mounted on the rod 80 adjacent its lower end and a sleeve 88 having a flange 90 is mounted on its upper end which, as illustrated, terminates below the wall 52 of the second cylinder 48. A coiled spring 92 is mounted on the rod with one end bearing against the block 86 and the other end bearing against the underside of the flange 90, so that it pushes the rod 80 and hence the plate 78 upwardly relative to the block 86. The block 86, in turn, is yieldingly supported in spaced relation to the wall 52 by a coiled spring 94 disposed about the spring 92 with one end secured to the block 86 and the other end secured to a block 96 fastened to the underside of the washer 56.

There is a port 98 for supplying pressure-fluid to the upper end of the second cylinder 48 and a port 100 for supplying pressure-fluid to the underside of the shoulder 50 of the second cylinder 48.

With the aforesaid structure the ram may be adjusted to move through a stroke which is greater than the distance between the beam and the platen to compensate for minor misalignment in the machine frame or die-supporting parts and die. This is accomplished by admitting fluid-pressure to the upper side of the second cylinder 48 through the port 98 so as to push the second cylinder 48 and plate 78 as a unit with the third cylinder 76 from the first cylinder 42, downwardly to engage the shoulder 50 with the shoulder 46 and then opening the valve 66 to permit fluid-pressure to enter the lower cavity 48a in the second cylinder 48 and to push the plate 78 down by further extension of the third cylinder 76 relative to the first cylinder, to press the die against the platen sufficiently hard to flex the platen downwardly into the yielding pad 34. Such downward pressure will flex that portion of the platen with which the die has contact downwardly an amount depending on the hydraulic pressure, the area of the die, the resistance of the platen being flexed and the yieldability of the pad supporting the platen to compensate for the angular misalignment of the cutting edge of the die therewith until the cutting edge of the die and platen are parallel. When parallelism, that is, contact of the entire cutting edge of the die and the surface of the platen have been achieved through downward flexing of that portion of the platen with which the die has contact, the valve 66 is closed to hold the fluid in the lower cavity 48a of the second cylinder, and pressure is supplied to the port 100 to raise the second cylinder 48.

In order to increase the loading force on the hardened steel cutting platen and the rubber pad for cutting of very hard to cut materials, it is, of course, possible to remove the die from the machine and with the cylinder 48 in its lowest position, to admit a small quantity of additional oil into the lower cavity 48a, by opening the valve 60 and closing it if this is required.

Having provided the flexibly supported platen described above, it is necessary that the plane of the cutting edge of the die be substantially uniformly flat, that is, the entire cutting edge must lie in a single flat plane. To this end, as shown in FIGS. 6 and 7, the cutting edge 102 of the die 104 is ground off flat so that the entire edge lies in a single plane as represented by the dotted lines $t-t$. The edge is then resharpened by grinding from one side or the other adjacent the edge to provide a knife-like thickness in the order of .002 to .001 but without intersecting the other side of the die.

When the machine is assembled and made ready for use, care will be exercised to insure parallelism between the overhead beam and the platen, between the die-supporting plate 78 and the platen and between the cutting edge of the die and the platen. Nevertheless, it is impossible to achieve perfect parallelism and since the hardened surface of the platen will not permit the cutting edge of the die to sink into it, the die will not cut cleanly if there is any appreciable misalignment. In a very much exaggerated illustration of such misalignment, FIG. 4 shows the ram and plate 78 tilted relative to the platen 15. When this condition exists, if the ram were lowered to press a die fastened to the plate 78 against work resting on the platen and the latter were unyielding, only the right side of the cutting edge of the die would engage and cut through the work. By providing the yielding pad and flexible platen as herein disclosed the die will force that portion of the platen with which it has contact downwardly to a corresponding inclination wherein the entire cutting edge of the die and the surface of the platen will be parallel as shown, so that the entire cutting edge of the die will have contact with the platen thus insuring cutting by the entire cutting edge of the die.

The foregoing features, to wit, the yielding support for a hardened flexible steel platen and the adjustment of the cutting stroke to effect downward displacement of the flexibly supported platen enables, in contrast to prior machines, automatic die-cutting of sheet material on a hardened steel platen with complete separation of the part from the waste; lessens wear on the die and platen and minimizes breakage.

It should be understood that the present disclosure is for the purpose of illustration only and that this invention includes all modifications and equivalents which fall within the scope of the appended claims.

I claim:

1. The combination in a die-cutting machine, of a hardened but flexible metal platen, a die, means supporting the die a predetermined distance above the platen for movement perpendicular thereto into engagement with work resting on the platen, said means providing for cutting movement which is greater than said predetermined distance, and a uniformly-thick flat cushion sheet yieldingly supporting the platen for flexing, following engagement of the die therewith, of that portion thereof with which the die has contact, to a position such that the entire edge of the die has contact with the platen.

2. The combination in a die-cutting machine, of a hardened but flexible metal platen, a die, a beam supporting the die a predetermined distance above the platen for movement transversely thereof and at predetermined intervals during transverse movement for movement perpendicular to the platen into engagement with work resting on the platen, means for imparting a cutting stroke to the die which is greater than said predetermined distance between the beam and the platen, and means supporting the platen for downward flexing, following engagement of the die therewith, of that part with which the die has contact into parallel relation to the die.

3. The combination in a die-cutting machine, of a hardened but flexible metal platen, a die, a beam supporting the die at a predetermined distance above the platen for movement parallel thereto and at predetermined intervals during said parallel movement for movement into engagement with work resting on the platen, means flexibly supporting the platen for yielding movement following engagement of the die therewith, and means for adjusting the cutting stroke of the die so that it is greater than said predetermined initial distance between the die and platen by an amount sufficient to flex the part of the platen with which the die has contact into the yieldable support to a position in which the entire cutting edge of the die has contact with the surface of the platen.

4. The combination in a die-cutting machine, of a frame, a flexible metal platen mounted on the frame, a rigid beam supported on the frame transversely of the platen and parellel thereto, a die mounted on the beam for movement transversely of the platen and perpendicular to the platen, said beam supporting the die a predetermined distance from the surface of the platen, means for adjusting the perpendicular stroke of the die so that it is greater than said predetermined distance between the die and platen, and a flat, uniformly thick rubber pad disposed beneath the platen yieldably supporting the platen for flexing under the applied load.

5. The combination according to claim 4, wherein the pad is in the order of ⅛ to ⅜ inch in thickness.

6. The combination according to claim 4, wherein the pad has a durometer in the order of 40 to 80.

7. The combination according to claim 4, wherein the platen consists of hardened and ground tool steel.

8. The combination according to claim 4, wherein the platen has a hardness of 55 Rockwell "C."

9. The method of die-cutting thin sheet material by movement of a die into engagement with material resting on a hardened flexible metal platen, comprising supporting the die for movement into engagement with the platen, initially moving the die into engagement with the platen sufficiently to flex the latter into the yieldable material until that part of the platen having contact with the die takes up a position parallel to the die, fixing the stroke of the die at this position, and then proceeding with cutting operations of the sheet material resting on the platen.

10. The method of die-cutting thin sheet material by movement of a die into engagement with a workpiece resting on a hardened flexible metal platen, comprising resiliently supporting the platen, initially moving the die into engagement with the platen at sufficient pressure to flex that portion of the latter with which it has contact until the entire edge of the die has contact with the surface of the platen, establishing a length of the stroke necessary to achieve such contact, and then commencing cutting operations of the sheet material on the platen.

11. The method of die-cutting sheet material by movement of a die into engagement with work resting on a flexible hardened metal platen, comprising resiliently supporting the platen, supporting the die for movement into engagement with the platen, initially moving the supported die into engagement with the platen sufficiently to flex that part of the platen with which the die has contact into parallel relation with the cutting edge of the die to compensate for initial misalignment of the die and platen, establishing the length of movement necessary to effect such parallel relation, and then moving the die through a greater distance to increase the loading of the resilient support.

12. The method of die-cutting thin sheet material by movement of a die into engagement with the material resting on a hardened flexible metal platen, comprising providing a motor for moving the die into engagement with the platen sufficiently to flex that portion of the platen with which the die has contact into the yieldable material into entire engagement of the cutting edge of the die with the surface of the platen, adjusting the motor at said position to establish the limit necessary to effect such entire engagement, reversing the motor to retract the die, readjusting the motor to extend the limit by a predetermined amount, and then commencing cutting operations of the sheet material.

13. The method of die-cutting thin sheet material on a flexible hardened metal platen, comprising providing a motor of variable stroke, moving the die into engagement with the platen by means of said motor to flex that part of the platen with which the die has contact sufficiently to cause the entire edge of the die to have contact with the surface of the platen, limiting the stroke by adjustment to the displacement necessary to achieve entire contact, reversing the motor, readjusting the length of the stroke to increase it a predetermined amount, and then commencing cutting operations.

14. The method of die-cutting thin sheet material comprising providing a flexible steel platen, supporting the platen on a rubber pad, supporting a die above the platen for movement into engagement therewith, providing a fluid-pressure operable motor for moving the die into engagement with the platen to flex that portion of the platen with which the die has contact into the pad far enough so that the entire cutting edge of the die has contact with the surface of the platen, adjusting the stroke of the motor at said position to limit its stroke, and then commencing cutting operations.

15. The method of die-cutting comprising, providing a yieldably backed flexible platen, providing a part movable relative to the platen, moving the part sufficiently to flex that portion of the platen with which the die has contact into the yieldable backing through a distance determined by the loading and resiliency of the backing to establish parallelism between the die and platen, determining the extent of movement necessary to achieve such parallelism, retracting the part, readjusting the part so as to effect movement thereof a predetermined further distance toward the platen to flex the platen further into the pad, and then commencing cutting operations.

References Cited by the Examiner
UNITED STATES PATENTS

| | | | |
|---|---|---|---|
| 2,191,655 | 2/1940 | Hardy | 83—540 |
| 3,052,145 | 9/1962 | Muller et al. | 83—530 |

WILLIAM W. DYER, Jr., *Primary Examiner.*

L. B. TAYLOR, *Assistant Examiner.*